United States Patent
Shen

(10) Patent No.: US 11,272,527 B2
(45) Date of Patent: Mar. 8, 2022

(54) RESOURCE INDICATION METHOD, USER EQUIPMENT, NETWORK DEVICE AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/720,314

(22) Filed: Dec. 19, 2019

(65) Prior Publication Data

US 2020/0128577 A1   Apr. 23, 2020

Related U.S. Application Data

(63) Continuation of application No. PCT/CN2017/111415, filed on Nov. 16, 2017.

(51) Int. Cl.
*H04W 72/12* (2009.01)
*H04W 76/27* (2018.01)
(Continued)

(52) U.S. Cl.
CPC ....... *H04W 72/1273* (2013.01); *H04L 5/0092* (2013.01); *H04W 72/042* (2013.01); *H04W 72/0453* (2013.01); *H04W 76/27* (2018.02)

(58) Field of Classification Search
None
See application file for complete search history.

(56) References Cited

U.S. PATENT DOCUMENTS

2014/0105155 A1   4/2014   Kim et al.
2015/0208387 A1   7/2015   Awad et al.
(Continued)

FOREIGN PATENT DOCUMENTS

CL   202000089 A1   5/2020
CL   202000091      5/2020
(Continued)

OTHER PUBLICATIONS

3GPP TSG RAN WG1 NR Ad-Hoc #2; R1-1710878; Qingdao, China, Jun. 27-30, 2017.
(Continued)

*Primary Examiner* — Ayaz R Sheikh
*Assistant Examiner* — Sori A Aga
(74) *Attorney, Agent, or Firm* — Young Basile Hanlon & MacFarlane, P.C.

(57) ABSTRACT

The present disclosure discloses a resource indication method, user equipment, a network device, and a computer storage medium. The method includes selecting a target mapping relationship from at least two candidate mapping relationships, determining a size of a target resource block group according to a size range of a bandwidth part in the target mapping relationship, and allocating frequency domain resource according to the size of the target resource block group and first control information sent from a network side. The at least two candidate mapping relationships at least include a first mapping relationship and a second mapping relationship. In the first mapping relationship, a size range of each group of bandwidth parts is mapped to a different resource block group size. In the second mapping relationship, size ranges of at least two groups of bandwidth parts can be mapped to a same resource block group size.

16 Claims, 2 Drawing Sheets

(51) Int. Cl.
*H04L 5/00* (2006.01)
*H04W 72/04* (2009.01)

(56) References Cited

U.S. PATENT DOCUMENTS

| 2017/0111217 | A1 | 4/2017 | Kim et al. | |
|---|---|---|---|---|
| 2018/0049203 | A1* | 2/2018 | Xue | H04L 5/0035 |
| 2018/0324760 | A1* | 11/2018 | Yuk | H04L 1/00 |
| 2020/0170016 | A1* | 5/2020 | Ji | H04W 72/0453 |

FOREIGN PATENT DOCUMENTS

| CL | 202000092 | A1 | 5/2020 |
|---|---|---|---|
| CL | 202000093 | A1 | 5/2020 |
| CN | 101588604 | A | 11/2009 |
| CN | 102668673 | A | 9/2012 |
| CN | 102769918 | A | 11/2012 |
| CN | 103181095 | A | 6/2013 |
| CN | 103973392 | A | 8/2014 |
| CN | 106162889 | A | 11/2016 |
| EP | 2822339 | A4 | 9/2015 |
| KR | 101761624 | B1 | 8/2017 |
| RU | 2586587 | C2 | 6/2016 |
| WO | 2009140907 | A1 | 11/2009 |
| WO | 2012149729 | A1 | 11/2012 |
| WO | 2014153752 | A1 | 10/2014 |
| WO | 2016161917 | A1 | 10/2016 |

OTHER PUBLICATIONS

3GPP TSG RAN WG1 Meeting #90bis; R1-1717839; Prague, Czechia, Oct. 9-13, 2017.
3GPP TSG RAN WG1 Meeting AH_NR#3 ; R1-1718365; Prague, CZ, Oct. 9-13, 2017; (R1-1716258).
3GPP TSG RAN WG1 #90bis; R1-1718580; Prague, Czech Republic, Oct. 9-13, 2017.
TW Notice of Allowance dated Nov. 21, 2019 from Application No. 107140707.
3GPP TSG RAN WG1 Meeting #91; R1-1719301; Reno, USA, Nov. 25-Dec. 1, 2017.
3GPP TSG RAN WG1 Meeting 90bis; R1-1718216; Prague, CZ, 9th-3th, Oct. 2017.
3GPP TS 38.214; V15.1.0 (Mar. 2018); 3rd Generation Partnership Project; Technical Specification Group Radio Access Network; NR; Physical layer procedures for data; (Release 15).
3GPP TSG RAN WG1 Meeting #91; Reno, USA, 2'71h Nov.-Dec. 1, 2017; R1-1720094.
3GPP TSG RAN WG1 Meeting 90bis; Prague, CZ, Oct. 9-13, 2017; R1-1718048.
3GPP TS 38.214 V0.1.1 (Aug. 2017); 3rd Generation Partnership Project; Technical Specification Group Radio Access Network; NR; Physical layer procedures for data; (Release 15).
3GPP TSG RAN WG1 NR Ad-Hoc#2; Qingdao, P.R. China Jun. 27-30, 2017; R1-1710164.
Extended European Search Report for EP Application 17932113.8 dated Jul. 28, 2020.
Canada First Office Action for CA Application 3,066,936 dated Feb. 25, 2021. (5 pages).
China First Office Action with English translation for CN Application 202010081183.X dated Apr. 19, 2021. (13 pages).
India First Examination Report for IN Application 201917050329 dated Mar. 22, 2021. (7 pages).
Russian Office Action with English translation for RU Application 2020122153 dated Jan. 28, 2021. (9 pages).
Chile Office Action with English Translation for CL Application 2020-00090 dated Apr. 20, 2021. (23 pages).
Chinese Second Office Action with English Translation for CN Application 202010081183.X dated Jun. 30, 2021. (12 pages).
Communication pursuant to Article 94(3) EPC for EP Application 17932113.8 dated Jun. 2, 2021. (11 pages).
Invitation pursuant to Rule 137(4) EPC for EP Application 17932113.8 dated Apr. 22, 2021. (5 pages).
Chinese Decision of Rejection with English Translation for CN Application 202010081183.X dated Sep. 6, 2021. (9 pages).
Canadian Examination Report for CA Application 3066936 dated Nov. 26, 2021. (5 pages).
3GPP TSG RAN1 WG1 Meeting #90bis Prague, Czech Republic, R1-1718644, Ericsson, On DL/UL Resource Allocation, Oct. 9-13, 2017 (7 pages).
TSG-RAN WG1 #90bis Prague, Czech Republic, R1-1719167, Ericsson, Summary of offline discussion on RBG size, Oct. 9-13, 2017. (1 page).
3GPP TSG RAN WG1 Meeting 91 Reno, USA, R1-1719973, OPP, Resource allocation for PDSCH/PUSCH, Nov. 27-Dec. 1, 2017. (10 pages).

* cited by examiner

RESOURCE INDICATION METHOD, USER EQUIPMENT, NETWORK DEVICE AND COMPUTER STORAGE MEDIUM

CROSS-REFERENCE TO RELATED APPLICATION(S)

This application is a continuation application of International Application No. PCT/CN2017/111415, filed on Nov. 16, 2017, the entire content of which is incorporated herein by reference.

TECHNICAL FIELD

The present disclosure relates to the technical field of communication processing, in particular to a resource indication method, user equipment, a network device and a computer storage medium.

BACKGROUND

In an existing LTE system, granularity of resource allocation in frequency domain is a resource block group (RBG). The number of resource blocks (RB) contained in an RBG, namely an RBG size, is related to a system bandwidth, as shown in Table 1.

TABLE 1

| System Bandwidth Range | RBG Size |
|---|---|
| ≤10 | 1 |
| 11-26 | 2 |
| 27-63 | 3 |
| 64-110 | 4 |

In 5th generation (5G) new radio (NR) standard, it has been determined that the RBG size will be related to the size of a bandwidth part (BWP) of a terminal, but not related to the size of the system bandwidth.

However, in the prior art, a mapping relation between the RBG size and the size of the bandwidth part is not specified. If different BWP sizes respectively correspond to different RBG sizes, better scheduling flexibility can be obtained. However, as different terminals may have different BWP sizes, multiple scheduling granularities need to be adopted simultaneously in a cell, which results in high complexity of scheduling of a base station. If a same RBG size is adopted for different RBG sizes, a scheduler of the base station can be simplified, but the scheduling flexibility will be greatly limited.

SUMMARY

To solve the foregoing technical problem, implementations of the present disclosure provide a resource indication method, user equipment, a network device and a computer storage medium.

An implementation of the present disclosure provides a resource indication method, applied to user equipment, including: selecting a target mapping relationship from at least two candidate mapping relationships; determining a size of a target resource block group according to a size range of a bandwidth part in the target mapping relationship; and allocating frequency domain resource according to the size of the target resource block group and first control information sent from a network side; wherein the at least two candidate mapping relationships at least include a first mapping relationship and a second mapping relationship; the first mapping relationship is a mapping relationship in which a size range of each group of bandwidth parts is mapped to a different resource block group size; the second mapping relationship is a mapping relationship in which size ranges of at least two groups of bandwidth parts are mapped to a same resource block group size.

An implementation of the present disclosure provides a resource indication method, applied to a network device, including: sending first control information to user equipment, wherein the first control information is used for indicating the user equipment to allocate frequency domain resource according to a size of a target resource block group in a target mapping relationship; wherein the target mapping relationship is one of at least two candidate mapping relationships, the at least two candidate mapping relationships at least include a first mapping relationship and a second mapping relationship; the first mapping relationship is a mapping relationship in which a size range of each group of bandwidth parts is mapped to a different resource block group size; the second mapping relationship is a mapping relationship in which size ranges of at least two groups of bandwidth parts are mapped to a same resource block group size.

An implementation of the present disclosure provides user equipment, including: a first processing unit used for selecting a target mapping relationship from at least two candidate mapping relationships, determining a size of a target resource block group according to a size range of a bandwidth part in the target mapping relation; and allocating frequency domain resource according to the size of the target resource block group and first control information sent from a network side; wherein the at least two candidate mapping relationships at least include a first mapping relationship and a second mapping relationship; the first mapping relationship is a mapping relationship in which a size range of each group of bandwidth parts is maps to a different resource block group size; the second mapping relationship is a mapping relationship in which size ranges of at least two groups of bandwidth parts are map to a same resource block group size; and a first communication unit used for receiving the first control information from the network side.

An implementation of the present disclosure provides a network device, including: a second communication unit used for sending first control information to user equipment, wherein the first control information is used for indicating the user equipment to allocate frequency domain resource according to a size of a target resource block group in a target mapping relationship; wherein the target mapping relationship is one of at least two candidate mapping relationships, the at least two candidate mapping relationships at least include a first mapping relationship and a second mapping relationship; the first mapping relationship is a mapping relationship in which a size range of each group of bandwidth parts is mapped to a different resource block group size; the second mapping relationship is a mapping relationship in which size ranges of at least two groups of bandwidth parts are mapped to a same resource block group size.

An implementation of the present disclosure provides a user equipment, including: a processor and a memory used for storing a computer program that is capable of being run on the processor; wherein the processor is used for running the computer program to perform acts of the aforementioned method.

An implementation of the present disclosure provides a network device, including: a processor and a memory used for storing a computer program that is capable of being run on the processor; wherein the processor is used for running the computer program to perform acts of the aforementioned method.

An implementation of the present disclosure provides a computer storage medium, wherein the computer storage medium stores computer-executable instructions that when executed implement acts of the aforementioned method.

According to the technical solutions of the implementations of the present invention, the user equipment can determine the target mapping relationship based on the at least two candidate mapping relationships, and further determine the frequency domain resource to be used through the control information sent from the network side. Furthermore, the at least two candidate mapping relationships can include the first mapping relationship in which different BWP ranges are mapped to different RBG sizes and the second mapping relationship in which different BWP ranges are mapped to a same RBG size. In this way, various mapping relationships can be flexibly used to allocate the frequency domain resource for the user equipment, therefor flexibility of scheduling is obtained, and complexity of scheduling of a base station and complexity of operations of a terminal can be reduced as well.

DETAILED DESCRIPTION

In order to obtain a more detailed understanding of features and technical contents of implementations of the present disclosure, implementations of the present disclosure will be described in detail below with reference to accompanying drawings. The accompanying drawings are for reference purposes only, but are not used for limiting the implementations of the present disclosure.

Example 1

Figure 1:
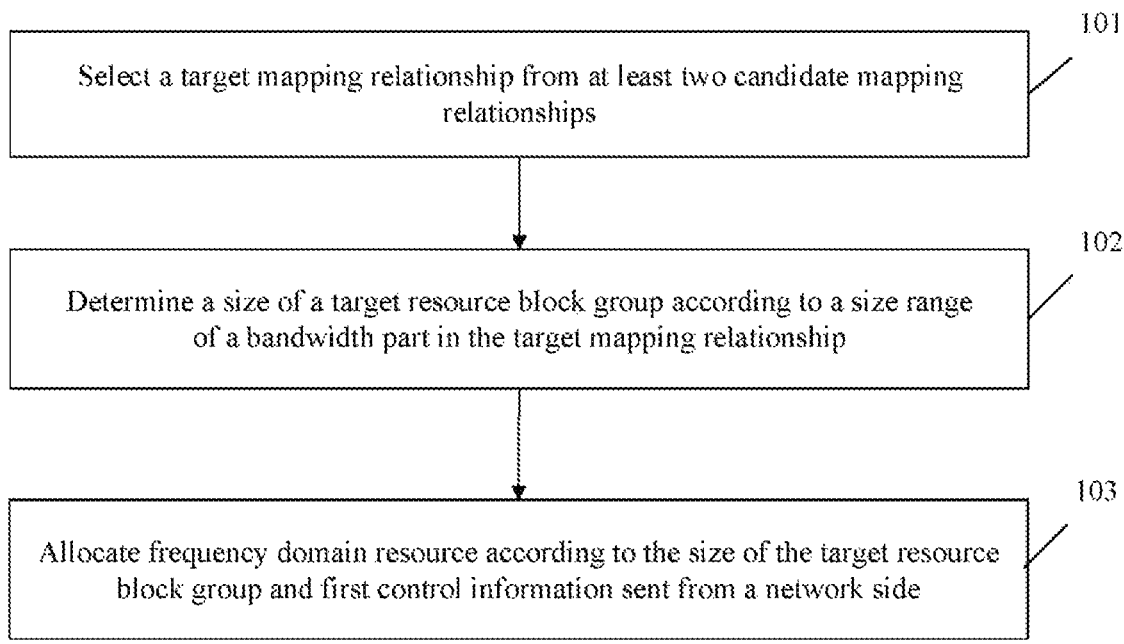
FIG. 1 is a schematic flowchart of a resource indication method according to an implementation of the present disclosure.

An implementation of the present disclosure provides a resource indication method, applied to user equipment, as shown in FIG. 1. The method includes acts 101 to 103.

In act 101, a target mapping relationship is selected from at least two candidate mapping relationships.

In act 102, a size of a target resource block group is determined according to a size range of a bandwidth part in the target mapping relationship.

In act 103, frequency domain resource is allocated according to the size of the target resource block group and first control information sent from a network side.

The at least two candidate mapping relationships at least include a first mapping relationship and a second mapping relationship. In the first mapping relationship, a size range of each group of bandwidth parts is mapped to a different resource block group size. In the second mapping relationship, size ranges of at least two groups of bandwidth parts are mapped to a same resource block group size.

The two mapping relationships are shown in Table 2:

TABLE 2

| Size Range of Bandwidth Parts (BWPs) | Corresponding RGB Size in First Mapping Relationship | Corresponding RBG Size in Second Mapping Relationship |
| --- | --- | --- |
| ≤18 | 1 | 4 |
| 19-36 | 2 | 4 |
| 37-72 | 4 | 4 |
| 73-144 | 8 | 16 |
| 145-275 | 16 | 16 |

It can be seen from Table 2 that in the first mapping relationship, different size ranges of bandwidth parts correspond to different resource block group sizes. For example, in Table 2, the resource block group sizes to which the size ranges of bandwidth parts are mapped are 1, 2, 4, 8 and 16 respectively. However, in the second mapping relationship, multiple different size ranges of bandwidth parts correspond to a same resource block group size. For example, in Table 2, three size ranges of bandwidth parts correspond to the same resource block group size of 4, and the remaining two size ranges of bandwidth parts correspond to the other resource block group size of 16. In addition, the size ranges of BWPs in the table may be set according to actual conditions, the table is only an example, but the size ranges of BWPs will not be exhaustive here.

The target mapping relationship may be the first mapping relationship or the second mapping relationship.

It should also be understood that in practice, there may be more mapping relationships which are not exhaustive in the implementations.

In the above act 101, the at least two candidate mapping relationships may be at least two candidate mapping relationships preset in the user equipment, or at least two candidate mapping relationships obtained from the network side.

The way to obtain the at least two candidate mapping relationships from the network side may include: obtaining the at least two candidate mapping relationships from radio resource control (RRC) configuration information or obtaining the at least two candidate mapping relationships from other information.

Specifically, selecting the target mapping relationship from the at least two candidate mapping relationships includes: selecting the target mapping relationship from the at least two candidate mapping relationships according to a first configuration signaling sent from the network side; or selecting the target mapping relationship from the at least two candidate mapping relationships according to a preset rule.

The first configuration signaling may be obtained through RRC configuration information. The first configuration signaling may include capability information of the network side, so as to enable the user equipment to determine which target mapping relationship is to be selected from the at least two candidate mapping relationships according to the first configuration signaling. For example, when a capability of the network side (base station) indicates that a load capacity of the network side is relatively low, the second mapping relationship may be selected as the target mapping relationship, otherwise the first mapping relationship may be selected as the target mapping relationship.

In addition, from the first configuration signaling, a target mapping relationship that is indicated by the network side as the one that the user equipment should select may be obtained. In this way, the network side (i.e., base station) may determine whether the network side is able to bear a large load according to a capability of the network side. If the network side is able to bear a large load, the network side may notify the user equipment, through the first configuration signaling, to select the first mapping relationship as the target mapping relationship; otherwise, notify the user equipment, through the first configuration signaling, to select the second mapping relationship as the target mapping relationship.

When the target mapping relationship is selected from the at least two candidate mapping relationships according to a preset rule, the preset rule may be determined according to a current system load detected by the user equipment. For example, if the current system load that is detected by the user equipment is relatively large, the second mapping relationship may be selected as the target mapping relationship, otherwise the first mapping relationship is selected as the target mapping relationship. A way of detecting the system load may be obtaining the system load through system load information sent from the network side, and the specific way of sending the system load will not be described in detail in the implementations.

In addition, the preset rule may be determined according to quality of a reference signal of the network side detected by the user equipment. For example, when the quality of the reference signal of the network side is detected to be relatively poor, the second mapping relationship may be selected as the target mapping relationship, and when the quality of the reference signal of the network side is detected to be relatively good, the first mapping relationship may be selected as the target mapping relationship.

Determining the quality of the reference signal may include that: when interference is less than a preset interference threshold, the quality of the reference signal is determined to be relatively good, otherwise the quality of the reference signal is determined to be relatively poor; or when a signal-to-noise ratio of the reference signal is higher than a preset signal-to-noise ratio threshold, it indicates that the quality of the reference signal is relatively good, otherwise it indicates that the quality of the reference signal is relatively poor. It should be understood that there may be other ways of determining the quality of the reference signal, which are not exhaustive in the implementations.

In the above act 102, the size of the target resource block group is determined according to the size range of the bandwidth part in the target mapping relationship. Referring to the above Table 2, when the target mapping relationship is determined, various sizes of resource block groups corresponding to various size ranges of bandwidth parts of the user equipment may be known.

Further, when the act 103 is performed, which size of the resource block group is to be selected from the target mapping relationship as the frequency domain resource used by the user equipment may be determined through the first control information sent from the network side.

The first control information may be control information transmitted through a physical downlink control channel. Specific content of the first control information may be identification information indicating a corresponding resource block group, and the identification information of the resource block group may be information that both the user equipment and the network side are able to know.

Alternatively, the specific content of the first control information may indicate a size of the bandwidth part to be used by the user equipment, so that the user equipment determines the size of the resource block group to be used by it according to the size of the bandwidth part.

Alternatively, the specific content of the first control information may be a size of a resource block group to be used by the user equipment directly indicated by the network side.

It can be seen that, by adopting the above scheme, the user equipment can determine the target mapping relationship based on the at least two candidate mapping relationships, and further determine frequency domain resource to be used through control information sent from a network side. Furthermore, the at least two candidate mapping relationships can include the first mapping relationship in which different BWP ranges are mapped to different RBG sizes and the second mapping relationship in which different BWP ranges are mapped to a same RBG size. In this way, various mapping relationships can be flexibly used to allocate the frequency domain resource for the user equipment, therefore flexibility of scheduling is obtained, and complexity of scheduling of a base station and complexity of operations of a terminal can be reduced as well.

Example 2

An implementation of the present disclosure provides a resource indication method, applied to a network device, including: sending first control information to user equipment, wherein the first control information is used for indicating the user equipment to allocate frequency domain resource according to a size of a target resource block group in a target mapping relationship; wherein the target mapping relationship is one of at least two candidate mapping relationships, the at least two candidate mapping relationships at least include a first mapping relationship and a second mapping relationship; in the first mapping relationship, a size range of each group of bandwidth parts is mapped to a different resource block group size; in the second mapping relationship, size ranges of at least two groups of bandwidth parts are mapped to a same resource block group size.

The network device provided in the implementation may be a base station at the network side or other device that is capable of performing transmission of control signaling and configuration signaling with the user equipment.

For the two mapping relationships, please refer to the above Table 2, which will not be repeated here.

It should also be understood that in practice, there may be more mapping relationships which are not exhaustive in the implementations.

The at least two candidate mapping relationships may be at least two candidate mapping relationships preset in the user equipment, or at least two candidate mapping relationships configured by the network device for the user equipment.

Sending the at least two candidate mapping relationships to the user equipment may include: sending the at least two candidate mapping relationships through radio resource control (RRC) configuration information or sending the at least two candidate mapping relationships through other information.

Specifically, selecting the target mapping relationship from the at least two candidate mapping relationships may include sending a first configuration signaling to the user equipment. The first configuration signaling is used for indicating the user equipment to select the target mapping relationship from the at least two mapping relationships.

The first configuration signaling may be obtained through RRC configuration information. The first configuration signaling may include capability information of the network side, so as to enable the user equipment to determine which target mapping relationship is to be selected from the at least two candidate mapping relationships according to the first configuration signaling. For example, when a capability of the network side (base station) indicates that a load capacity of the network side is relatively low, the second mapping relationship may be selected as the target mapping relationship, otherwise the first mapping relationship may be selected as the target mapping relationship.

In addition, from the first configuration signaling, a target mapping relationship that is indicated by the network side as the one that the user equipment should select may be obtained. In this way, the network side (i.e., base station) may determine whether the network side is able to bear a large load according to a capability of the network side. If the network side is able to bear a large load, the network side may notify the user equipment, through the first configuration signaling, to select the first mapping relationship as the target mapping relationship; otherwise, notify the user equipment, through the first configuration signaling, to select the second mapping relationship as the target mapping relationship.

The first control information in the implementation may be control information transmitted through a physical downlink control channel. Specific content of the first control information may be identification information indicating a corresponding resource block group, and the identification information of the resource block group may be information that both the user equipment and the network device are able to know.

Alternatively, the specific content of the first control information may indicate the size of the bandwidth part to be used by the user equipment, so that the user equipment determines the size of the resource block group to be used by it according to the size of the bandwidth part.

Alternatively, the specific content of the first control information may be a size of a resource block group to be used by the user equipment directly indicated by for the network device.

It can be seen that by adopting the above scheme, the user equipment can determine the target mapping relationship based on the at least two candidate mapping relationships, and further determine frequency domain resource to be used through control information sent from the network side. Furthermore, the at least two candidate mapping relationships can include the first mapping relationship in which different BWP ranges are mapped to different RBG sizes and the second mapping relationship in which different BWP ranges are mapped to a same RBG size. In this way, various mapping relationships can be flexibly used to allocate the frequency domain resource for the user equipment, therefore flexibility of scheduling is obtained, and complexity of scheduling of a base station and complexity of operations of a terminal can be reduced as well.

Example 3

Figure 2:
FIG. 2 is a schematic diagram of structure of user equipment according to an implementation of the present disclosure.

An implementation of the present disclosure provides a user equipment, as shown in FIG. 2, the user equipment includes a first processing unit 21 and a first communication unit 22.

The first processing unit 21 is used for selecting a target mapping relationship from at least two candidate mapping relationships, determining a size of a target resource block group according to a size range of a bandwidth part in the target mapping relation, and allocating frequency domain resource according to the size of the target resource block group and first control information sent from a network side. The at least two candidate mapping relationships at least include a first mapping relationship and a second mapping relationship. In the first mapping relationship, a size range of each group of bandwidth parts is mapped to a different resource block group size. In the second mapping relationship, size ranges of at least two groups of bandwidth parts are mapped to a same resource block group size.

The first communication unit 22 is used for receiving the first control information from the network side.

For the two mapping relationships, please refer to the above Table 2, which will not be repeated here.

It should also be understood that in practice, there may be more mapping relationships which are not exhaustive in the implementation.

The at least two candidate mapping relationships may be at least two candidate mapping relationships preset in the user equipment, or at least two candidate mapping relationships obtained by the first communication unit 22 from the network side.

The way to obtain the at least two candidate mapping relationships from the network side may include: obtaining the at least two candidate mapping relationships from radio resource control (RRC) configuration information or obtaining the at least two candidate mapping relationships from other information.

Specifically, selecting the target mapping relationship from the at least two candidate mapping relationships includes: the first communication unit 22 receives a first configuration signaling from the network side, and the first processing unit 21 selects the target mapping relationship from the at least two candidate mapping relationships according to the first configuration signaling sent from the network side; or the first processing unit 21 selects the target mapping relationship from the at least two candidate mapping relationships according to a preset rule.

The first configuration signaling may be obtained from RRC configuration information. The first configuration signaling may include capability information of the network side, so as to enable the user equipment to determine which target mapping relationship is to be selected from the at least two candidate mapping relationships according to the first configuration signaling. For example, when a capability of the network side (base station) indicates that a load capacity of the network side is relatively low, the second mapping relationship may be selected as the target mapping relationship, otherwise the first mapping relationship may be selected as the target mapping relationship.

In addition, from the first configuration signaling, a target mapping relationship that is indicated by the network side as the one that the user equipment should select may be obtained. In this way, the network side (i.e., base station) may determine whether the network side is able to bear a large load according to a capability of the network side. If the network side is able to bear a large load, the network side may notify the user equipment, through the first configuration signaling, to select the first mapping relationship as the target mapping relationship, otherwise, notify the user equipment, through the first configuration signaling, to select the second mapping relationship as the target mapping relationship.

When the target mapping relationship is selected from the at least two candidate mapping relationships according to a preset rule, the preset rule may be determined according to a current system load detected by the user equipment. For example, if the current system load detected is relatively large, the second mapping relationship may be selected as the target mapping relationship, otherwise the first mapping relationship is selected as the target mapping relationship. A way of detecting the system load may be obtaining the system load through system load information sent from the network side, and the specific way of sending the system load will not be described in detail in the implementation.

In addition, the preset rule may be determined according to quality of a reference signal of the network side detected by the user equipment. For example, when the quality of the reference signal of the network side is detected to be relatively poor, the second mapping relationship may be selected as the target mapping relationship, and when the quality of the reference signal of the network side is detected to be relatively good, the first mapping relationship may be selected as the target mapping relationship.

Determining the quality of the reference signal may include that: when interference is less than a preset interference threshold, the quality of the reference signal is determined to be relatively good, otherwise the quality of the reference signal is determined to be relatively poor; or when a signal-to-noise ratio of the reference signal is higher than a preset signal-to-noise ratio threshold, it indicates that the quality of the reference signal is relatively good, otherwise it indicates that the quality is relatively poor. It should be understood that there may be other ways of determining the quality of the reference signal, which are not exhaustive in the implementations.

The size of the target resource block group is determined according to the size range of the bandwidth part in the target mapping relationship. Referring to the above Table 2, when the target mapping relationship is determined, various sizes of resource block groups corresponding to various size ranges of bandwidth parts of the user equipment may be known.

Further, which size of the resource block group is to be selected from the target mapping relationship as the frequency domain resource used by the user equipment may be determined by the first processing unit 21 through the first control information sent from the network side.

The first control information may be control information transmitted through a physical downlink control channel. Specific content of the first control information may be identification information indicating a corresponding resource block group, and the identification information of the resource block group may be information that both the user equipment and the network side are able to know.

Alternatively, the specific content of the first control information may indicate the size of the bandwidth part to be used by the user equipment, so that the user equipment determines the size of the resource block group to be used by it according to the size of the bandwidth part.

Alternatively, the specific content of the first control information may be a size of the resource block group to be used by the user equipment directly indicated by the network side.

It can be seen that by adopting the above scheme, the user equipment can determine a target mapping relationship based on the at least two candidate mapping relationships, and further determine the frequency domain resource to be used through the control information sent from the network side. Furthermore, the at least two candidate mapping relationships can include the first mapping relationship in which different BWP ranges map to different RBG sizes and the second mapping relationship in which different BWP ranges are mapped to a same RBG size. In this way, various mapping relationships can be flexibly used to allocate the frequency domain resource for the user equipment, therefore, flexibility of scheduling is obtained, and complexity of scheduling of a base station and complexity of operations of a terminal can be reduced as well.

Example 4

Figure 3:
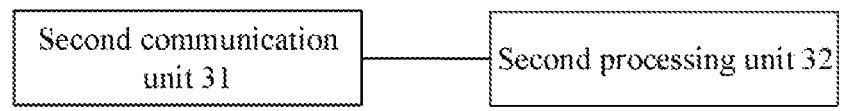
FIG. 3 is a schematic diagram of structure of a network device according to an implementation of the present disclosure.

An implementation of the present disclosure provides a network device. As shown in FIG. 3, the network device includes a second communication unit 31.

The second communication unit 31 is used for sending first control information to user equipment. The first control information is used for indicating the user equipment to allocate frequency domain resource according to a size of a target resource block group in a target mapping relationship. The target mapping relationship is one of at least two candidate mapping relationships, the at least two candidate mapping relationships at least include a first mapping relationship and a second mapping relationship; in the first mapping relationship, a size range of each group of bandwidth parts is mapped to a different resource block group size; in the second mapping relationship, size ranges of at least two groups of bandwidth parts are mapped to a same resource block group size.

The network device provided in the implementation may be a base station at the network side or other device that is capable of performing transmission of control signaling and configuration signaling with the user equipment.

For the two mapping relationships, please refer to the above Table 2, which will not be repeated here.

It should also be understood that in practice, there may be more mapping relationships which are not exhaustive in the implementations.

The at least two candidate mapping relationships may be at least two candidate mapping relationships preset in the user equipment, or at least two candidate mapping relationships configured by the network device for the user equipment. That is to say, the network device further includes: a second processing unit 32 used for determining the at least two candidate mapping relationships; wherein the second communication unit 31 is further used for configuring the at least two candidate mapping relationships for the user equipment.

The second communication unit 31 is used for sending the at least two candidate mapping relationships to the user equipment in a following way: sending the at least two candidate mapping relationships through radio resource control (RRC) configuration information or sending the at least two candidate mapping relationships through other information.

Specifically, selecting the target mapping relationship from the at least two candidate mapping relationships may include that, the second communication unit 31 sends a first configuration signaling to the user equipment, and the first configuration signaling is used for indicating the user equipment to select the target mapping relationship from the at least two mapping relationships.

The first configuration signaling may be obtained from RRC configuration information. The first configuration signaling may include capability information of the network side, so as to enable the user equipment to determine which target mapping relationship to be selected from the at least two candidate mapping relationships according to the first configuration signaling. For example, when a capability of the network side (base station) indicates that its load capacity is relatively low, the second mapping relationship may be selected as the target mapping relationship, otherwise the first mapping relationship may be selected as the target mapping relationship.

In addition, from the first configuration signaling, a target mapping relationship that is indicated by the network side as the one that the user equipment should select may be obtained. In this way, the network side (i.e., base station) may determine whether the network side is able to bear a large load according to its own capability. If the network side is able to bear a large load, the network side may notify the user equipment, through the first configuration signaling, to select the first mapping relationship as the target mapping relationship, otherwise, notify the user equipment, through the first configuration signaling, to select the second mapping relationship as the target mapping relationship.

The first control information in the implementation may be control information transmitted through a physical downlink control channel. The specific content of the first control information may be identification information indicating a corresponding resource block group, and the identification information of the resource block group may be information that both the user equipment and network device are able to know.

Alternatively, the specific content of the first control information may indicate the size of the bandwidth part to be used by the user equipment, so that the user equipment determines the size of the resource block group to be used by it according to the size of the bandwidth part.

Alternatively, the specific content of the first control information may a size of the resource block group to be used by the user equipment directly indicated by the network device.

It can be seen that by adopting the above scheme, the user equipment can determine the target mapping relationship based on the at least two candidate mapping relationships, and further determine the frequency domain resource to be used through the control information sent from the network side. Furthermore, the at least two candidate mapping relationships can include the first mapping relationship in which different BWP ranges are mapped to different RBG sizes and the second mapping relationship in which different BWP ranges are mapped to a same RBG size. In this way, various mapping relationships can be flexibly used to allocate the frequency domain resource for the user equipment, therefore flexibility of scheduling is obtained, and complexity of scheduling of a base station and complexity of operations of a terminal can be reduced as well.

Figure 4:
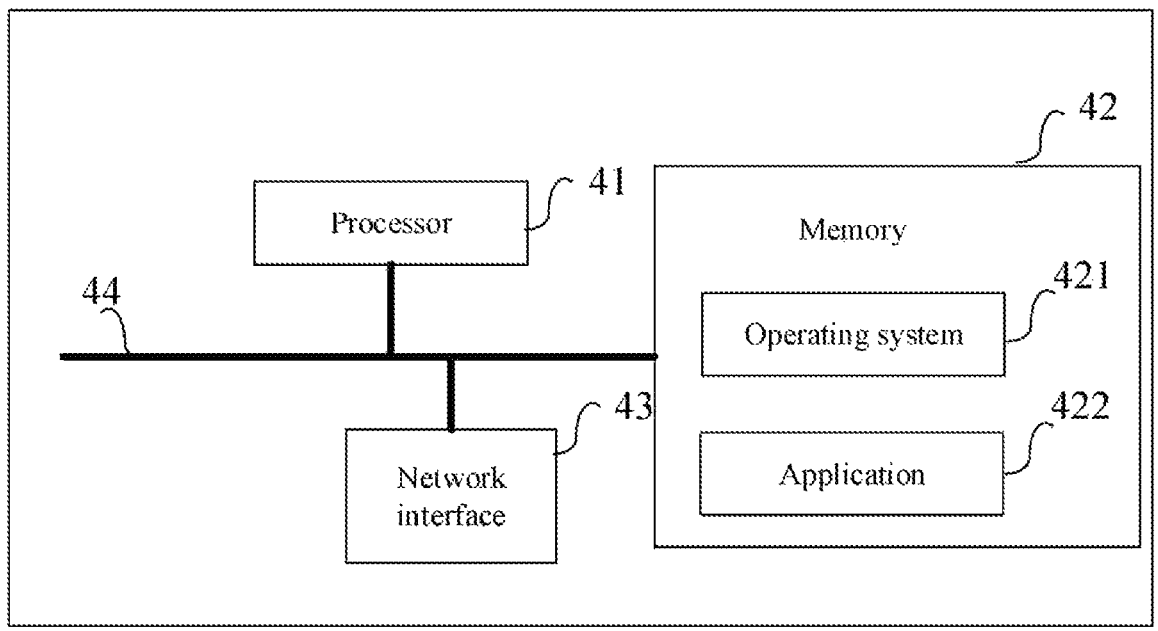
FIG. 4 is a schematic diagram of architecture of hardware according to an implementation of the present disclosure.

An implementation of the present disclosure also provides architecture of hardware composition of user equipment or a network device, which includes at least one processor 41, a memory 42, and at least one network interface 43, as shown in FIG. 4. The various components are coupled together by a bus system 44. It will be understood that the bus system 44 is used for implementing connection and communication between these components. The bus system 44 further includes a power bus, a control bus, and a status signal bus, in addition to a data bus. However, for sake of conciseness, various buses are all denoted as the bus system 44 in FIG. 4.

It should be understood that the memory 42 in the implementations of the present disclosure may be a volatile memory or a non-volatile memory, or it may include both volatile and non-volatile memories.

In some implementations, the memory 42 stores the following elements: an executable module or a data structure, or subsets thereof, or extension sets thereof: an operating system 421 and an application 422.

The processor 41 is configured to process acts in methods in the first example or the second example, which will not be described here.

An implementation of the present disclosure provides a computer storage medium. The computer storage medium stores computer-executable instructions that are executable for implementing acts of the method according to the first example or the second example.

When devices of the implementations of the present disclosure are implemented in a form of software functional modules and sold or used as independent products, the functions may be stored in a computer-readable storage medium. Based on this understanding, the technical solutions of the implementations of the present disclosure, in essence, or the part contributing to the related art may be embodied in the form of a software product stored in a storage medium, including several instructions for causing a computer device (which may be a personal computer, a server, or a network device, etc.) to perform all or parts of the methods described in various implementations of the present disclosure. The foregoing storage medium includes: a U-disk, a portable hard disk, a read-only memory (ROM), a magnetic disk, an optical disk, or other media capable of storing program code. Thus, the implementations of the present disclosure are not limited to any specific combination of hardware and software.

Correspondingly, an implementation of the present disclosure also provides a computer storage medium in which a computer program is stored, and the computer program is configured to execute the resource indication method of the implementation of the present disclosure.

Although the preferred implementations of the present disclosure have been disclosed for illustrative purposes, those skilled in the art will recognize that various modifications, additions and substitutions are also possible, and therefore, the scope of the present disclosure should not be limited to the above implementations.

What is claimed is:

1. A method for resource indication, applied to user equipment, and the method comprising:
   selecting a target mapping relationship from at least two candidate mapping relationships;
   determining a size of a target resource block group according to a size range of a bandwidth part in the target mapping relationship; and
   allocating frequency domain resource according to the size of the target resource block group and first control information sent from a network side;
   wherein the at least two candidate mapping relationships at least comprise a first mapping relationship and a second mapping relationship; the first mapping relationship is a mapping relationship in which different size ranges of bandwidth parts correspond to different resource block group sizes; the second mapping relationship is a mapping relationship in which size ranges of at least two different size ranges of bandwidth parts correspond to a same resource block group size; and
   wherein selecting the target mapping relationship from the at least two candidate mapping relationships comprises:
   selecting the target mapping relationship from the at least two candidate mapping relationships according to a first configuration signaling comprises capability information of the network side; or selecting the target mapping relationship from the at least two candidate mapping relationships according to a preset rule.

2. The method of claim 1, wherein the method further comprises:

obtaining the at least two candidate mapping relationships from the network side.

3. The method of claim 1, wherein the first control information is transmitted through a physical downlink control channel.

4. The method of claim 1, wherein the first configuration signaling is obtained through radio resource control configuration information.

5. A method for resource indication, applied to a network device, and the method comprising:

sending first control information to a user equipment, wherein the first control information is used for indicating the user equipment to allocate frequency domain resource according to a size of a target resource block group in a target mapping relationship; and sending a first configuration signaling to the user equipment, wherein the first configuration signaling is used for indicating the user equipment to select the target mapping relationship from at least two candidate mapping relationships, the at least two candidate mapping relationships at least comprise a first mapping relationship and a second mapping relationship, wherein the first mapping relationship is a mapping relationship in which different size ranges of bandwidth parts correspond to different resource block group sizes, wherein the second mapping relationship is a mapping relationship in which size ranges of at least two different size ranges of bandwidth parts correspond to a same resource block group size, and wherein the first configuration signaling comprises capability information of the network device.

6. The method of claim 5, wherein the method further comprises:

configuring the at least two candidate mapping relationships for the user equipment.

7. The method of claim 5, wherein the first control information is transmitted through a physical downlink control channel.

8. The method of claim 5, wherein the first configuration signaling is obtained through radio resource control configuration information.

9. A user equipment, comprising: a processor, a memory, and at least one network interface;

wherein the memory is used for storing a computer program that is capable of being run on the processor;

wherein the processor is used for, when running the computer program, performing acts of:

selecting a target mapping relationship from at least two candidate mapping relationships, determining a size of a target resource block group according to a size range of a bandwidth part in the target mapping relationship, and allocating frequency domain resource according to the size of the target resource block group and first control information sent from a network side; wherein the at least two candidate mapping relationships at least comprise a first mapping relationship and a second mapping relationship; the first mapping relationship is a mapping relationship in which different size ranges of bandwidth parts correspond to different resource block group sizes; the second mapping relationship is a mapping relationship in which size ranges of at least two different size ranges of bandwidth parts correspond to a same resource block group size;

wherein the processor is used for running the computer program to control the at least one network interface to perform an act of: receiving the first control information from the network side; and wherein the processor is further used for at least one of:

control the at least one network interface to perform acts of receiving a first configuration signaling sent from the network side, and selecting the target mapping relationship from the at least two candidate mapping relationships according to the first configuration signaling sent from the network side, wherein the first configuration signaling comprises capability information of the network side; or when running the computer program, performing an act of selecting the target mapping relationship from the at least two candidate mapping relationships according to a preset rule.

10. The user equipment of claim 9, wherein the processor is further used for, when running the computer program, performing an act of:

obtaining the at least two candidate mapping relationships from the network side.

11. The user equipment of claim 9, wherein the first control information is transmitted through a physical downlink control channel.

12. The user equipment of claim 9, wherein the first configuration signaling is obtained through radio resource control configuration information.

13. A network device comprising: a processor, a memory, and at least one network interface;

wherein the memory is used for storing a computer program that is capable of being run on the processor; and the processor is used for running the computer program to control the at least one network interface to perform acts of:

sending first control information to user equipment, wherein the first control information is used for indicating the user equipment to allocate frequency domain resource according to a size of a target resource block group in a target mapping relationship; and sending a first configuration signaling to the user equipment, wherein the first configuration signaling is used for indicating the user equipment to select the target mapping relationship from at least two candidate mapping relationships, wherein the at least two candidate mapping relationships at least comprise a first mapping relationship and a second mapping relationship, wherein the first mapping relationship is a mapping relationship in which different size ranges of bandwidth parts correspond to different resource block group sizes, wherein the second mapping relationship is a mapping relationship in which size ranges of at least two different size ranges of bandwidth parts correspond to a same resource block group size, and wherein the first configuration signaling comprises capability information of the network side.

14. The network device of claim 13, wherein the processor is further used for, when running the computer program, performing acts of:

determining the at least two candidate mapping relationships; and configuring the at least two candidate mapping relationships for the user equipment.

15. The network device of claim 13, wherein the first control information is transmitted through a physical downlink control channel.

16. The network device of claim 13, wherein the first configuration signaling is obtained through radio resource control configuration information.

* * * * *